E. F. BARNETT.
DUST COLLECTING HOOD.
APPLICATION FILED MAY 8, 1917.

1,255,110.

Patented Jan. 29, 1918.

INVENTOR.
Ernest F. Barnett

UNITED STATES PATENT OFFICE.

ERNEST FREDERICK BARNETT, OF LEICESTER, ENGLAND, ASSIGNOR, BY MESNE ASSIGNMENTS, TO UNITED SHOE MACHINERY CORPORATION, OF PATERSON, NEW JERSEY, A CORPORATION OF NEW JERSEY.

DUST-COLLECTING HOOD.

1,255,110.   Specification of Letters Patent.   Patented Jan. 29, 1918.

Application filed May 8, 1917. Serial No. 167,345.

*To all whom it may concern:*

Be it known that I, ERNEST F. BARNETT, a subject of the King of England, residing at Leicester, in the county of Leicester, England, have invented certain Improvements in Dust-Collecting Hoods, of which the following description, in connection with the accompanying drawings, is a specification, like reference characters on the drawings indicating like parts in the several figures.

This invention refers to rotary cutting or abrading machines, and in particular to rotary trimming or scouring machines for shoes. It is highly desirable that the fine dust or chips removed by the cutter or abrading tool from the shoe be entirely removed, and for this purpose such machines have been provided with hoods connected with suction apparatus.

It has been found that the relation of the mouth or orifice of the suction apparatus to the point at which the dust or chips are generated has considerable influence on the completeness of their removal and the consequent satisfactory operation of the apparatus. The operator, in using a machine of this type generally applies the work to the rotating tool in a plane tangent thereto, and passing through his eye in order to control the operation satisfactorily. The result is that tall and short operators apply the work to the tool in different positions so that the point of contact of the work and tool moves around the tool in accordance with the size and idiosyncracies of the operator. The situation of the dust collecting channel relative to the stream of material removed is therefore variable, this stream being in general tangent to the rotating tool at its point of contact with the work. The varying direction of the stream results in inefficient action of the dust collecting means.

It is the object of my invention to provide a dust collecting apparatus which shall not be subject to this objection, and which shall perform its functions satisfactorily under changing conditions of operation of the machine to which it is attached.

A feature of the invention is the combination of a rotary tool for removing material from the work, and a collector for the material removed having an orifice adjustable around the tool. The orifice may thus be placed in its most advantageous position relative to the stream of removed material.

Another feature of the invention is the combination of a rotary tool for removing material from the work and a collector having an orifice for the admission of the material removed, the orifice carrying portion of the collector being arranged for adjustment relative to the point of operation of the tool whereby the orifice may be moved into the path of a dust stream originating at a variable position on the periphery of the tool.

These and other features of the invention comprising various combinations and arrangements of parts will be best understood and appreciated from the following description of a preferred embodiment thereof selected for purposes of illustration and shown in the accompanying drawings in which—

Figure 1:
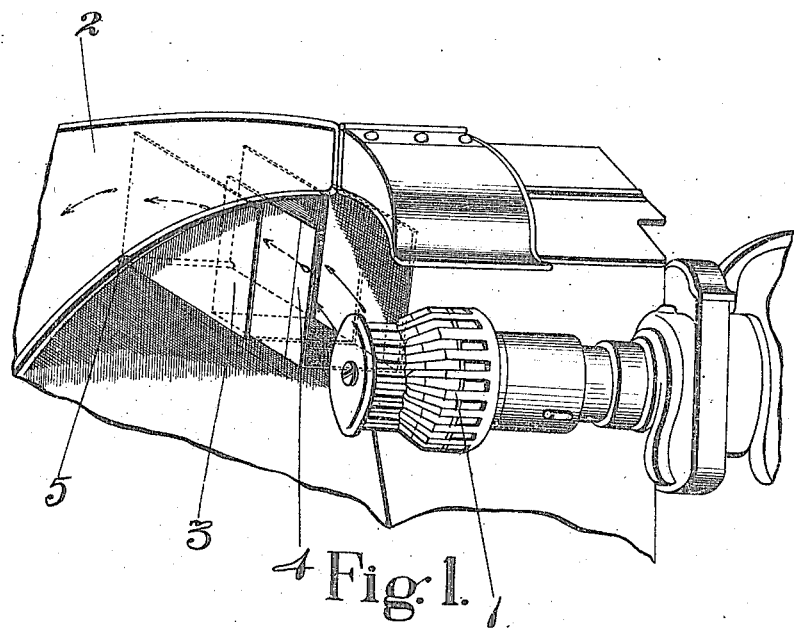
Figure 1 is a perspective view of the machine.

The rotating tool is here shown as a forepart edge trimmer, though it may be any trimming or abrading tool. The hood 2 is mounted on the machine close to the tool and envelops it to some extent. The differences in the way in which the work is presented to the tool, and the variations in the work itself impose serious limitations upon the closeness with which a hood can be made to hug the rotating tool, and it is therefore impossible to place a fixed dust collecting orifice very close to the tool. The chute 3, which may be formed of metal bent into a U-shape, is hinged to the hood body at 5, and forms its lower part. The spring of the U sides holds them in frictional engagement with the sides of the upper part of the hood body and thus holds the chute 3 in any adjusted position about the hinge 5. The rear end of the hood 2 is connected to the suction apparatus of the factory in any desired way.

Sliding in the chute 3 is a U-shaped extension 4 which is likewise held in any adjusted position in the chute 3 by the spring of its sides. It will be found that there is a more or less definite position of the end of the extension 4 which constitutes the mouth or orifice of the chute relative to the point of contact of the work and tool, (where the material to be removed is generated), which corresponds to maximum effectiveness in removing the dust. When this point of contact, which is on the lower face of the tool, is shifted around the tool by variations of physical conformation or habit on the part of the operator or of conditions imposed by different sorts of work, with consequent alteration of position and direction of the dust stream, the two adjustments of the extension 4, namely around the hinge 5 and toward and from the rotating tool by means of the sliding relation between the members 3 and 4, will permit the placing of the dust gathering end of the extension 4 in the proper relation to the point of dust generation and the stream of dust, which will therefore be impelled into the suction apparatus with the same efficiency at all times.

Figure 2:
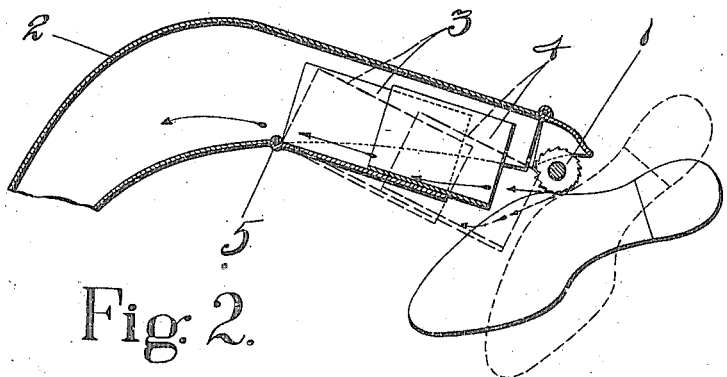
Fig. 2 is a side elevation of the machine showing two adjustments of the dust removing apparatus.

Fig. 2 illustrates two adjustments of the apparatus corresponding to two different work positions. The chute is adjusted in each case so that the dust stream, which is substantially tangent to the tool-periphery, enters its end, and is drawn away by the suction apparatus. This permits the adjustment of the edge of the collecting orifice which is nearest to the point of dust generation in the direction of rotation of the tool, around the periphery of the tool so as to follow the point of dust generation as it is varied by different operators. It is clear that a fixed chute in proper position to take up the waste product coming from a shoe in the dotted position would interfere with an operator who holds his work in the full line position.

Having described my invention, what I claim as new and desire to secure by Letters Patent of the United States is:

1. In a machine of the class described, a rotary tool for removing material from the work, and a collector for the removed material having an orifice adjustable around the tool.

2. In a machine of the class described, a rotary tool for removing material from the work, and a collector for the material removed having an orifice that portion of whose edge which is nearest the operating point of the tool in the direction of rotation is arranged to be adjusted around the periphery of the tool, whereby it may intercept a dust stream proceeding from a variable position on the tool.

3. In a machine of the class described, a rotary tool for removing material from the work, and a collector having an orifice arranged for admission of the material removed, the orifice carrying portion of the collector being constructed and arranged for adjustment perpendicular to the axis of the rotating tool.

4. In a machine of the class described, a rotary tool for removing material from the work, and a collector having an orifice for the admission of the material removed, the orifice carrying portion of the collector being constructed and arranged for adjustment in two directions perpendicular to the axis of the rotating tool.

5. In a machine of the class described, a rotary tool for removing material from the work, and a collector having an orifice for the admission of the material removed, the orifice carrying portion of the collector being constructed and arranged for rotary and sliding adjustment relative to the point of operation of the tool.

6. In a machine of the class described, a rotary tool for removing material from the work, and a collector having an orifice for the reception of the material removed, the orifice carrying portion of the collector being constructed and arranged for adjustment relative to the point of operation of the tool whereby the orifice may be moved into the path of a dust stream originating at a point within a substantial range on the periphery of the tool.

In testimony whereof I have signed my name to this specification.

ERNEST FREDERICK BARNETT.

Copies of this patent may be obtained for five cents each, by addressing the "Commissioner of Patents, Washington, D. C."